(12) United States Patent
Son et al.

(10) Patent No.: US 8,892,950 B2
(45) Date of Patent: Nov. 18, 2014

(54) FAILURE DIAGNOSIS METHOD AND APPARATUS USING RESOURCE RELATIONSHIP MAP

(75) Inventors: Ji Yeon Son, Daejeon (KR); Jihyun Lee, Daejeon (KR); Hark Jin Lee, Daejeon (KR); Jeu Young Kim, Daejeon (KR); Young Sung Son, Daejeon (KR); Jun Hee Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 377 days.

(21) Appl. No.: 13/328,242

(22) Filed: Dec. 16, 2011

(65) Prior Publication Data

US 2012/0159249 A1    Jun. 21, 2012

(30) Foreign Application Priority Data

Dec. 17, 2010    (KR) .................. 10-2010-0130191

(51) Int. Cl.
*G06F 11/00*    (2006.01)
*G06F 11/07*    (2006.01)

(52) U.S. Cl.
CPC .................................. *G06F 11/079* (2013.01)
USPC .......................................................... 714/37

(58) Field of Classification Search
CPC ............ G06F 15/167; G06F 17/30194; G06F 17/30864; G06F 9/5072; G06F 11/0733; G06F 11/079; G06F 11/202; G06F 11/2221; G06F 11/2252; G06F 11/2257; G06F 11/3013; G06F 11/3055; G06F 17/3043
USPC .......................................................... 714/37
See application file for complete search history.

(56) References Cited

U.S. PATENT DOCUMENTS

| 7,379,061 | B2 * | 5/2008 | Castonguay et al. ......... 345/420 |
| 7,424,530 | B2 * | 9/2008 | Chagoly et al. ............... 709/224 |
| 7,552,447 | B2 * | 6/2009 | Uthe ............................. 719/318 |
| 7,804,791 | B2 | 9/2010 | Farkas et al. |
| 7,836,156 | B1 * | 11/2010 | Ou et al. ....................... 709/220 |
| 8,122,281 | B2 * | 2/2012 | Bansal et al. ..................... 714/3 |
| 8,499,204 | B2 * | 7/2013 | Lovy et al. ...................... 714/57 |
| 2008/0288827 | A1 * | 11/2008 | Chagoly et al. ................ 714/47 |
| 2010/0118710 | A1 * | 5/2010 | Ogawa et al. ................. 370/242 |
| 2011/0264967 | A1 * | 10/2011 | Lovy et al. ..................... 714/49 |
| 2012/0185736 | A1 * | 7/2012 | Sambamurthy et al. ..... 714/47.3 |

FOREIGN PATENT DOCUMENTS

JP    2009-177635    6/2009

* cited by examiner

*Primary Examiner* — Bryce Bonzo
(74) *Attorney, Agent, or Firm* — Staas & Halsey LLP (57) ABSTRACT

A failure diagnosis method includes: generating a resource relationship map of resources to be managed on a network; and when a failure occurs in a certain service object within the network, extracting a topology relationship map from the resource relationship map by using the failed service object as a root node. The failure diagnosis method further includes searching a resource object caused the failure while checking related objects, starting from the root node in the topology relationship map.

18 Claims, 6 Drawing Sheets

FAILURE DIAGNOSIS METHOD AND APPARATUS USING RESOURCE RELATIONSHIP MAP

CROSS-REFERENCE(S) TO RELATED APPLICATION(S)

The present invention claims priority of Korean Patent Application No. 10-2010-0130191, filed on Dec. 17, 2010, which is incorporated herein by reference.

FIELD OF THE INVENTION

The present invention relates to failure diagnosis in a network environment provided at home or in a building, and more particularly, to a failure diagnosis method and apparatus using a resource relationship map, which are capable of reducing an overhead for analyzing the cause of failure by tracking the cause of failure, starting from a failed object, and then following entities of the relationship map, using the resource relationship map including a resource object and a relation object, and systematically and precisely tracking the cause of failure by searching the resource relationship map.

BACKGROUND OF THE INVENTION

In general, among conventional methods of diagnosing and processing a failure which may occur in various electronic devices or network equipments at home or in a building, most methods analyze system logs or failure occurrence messages to find the cause of failure.

In the conventional methods as described above, however, as the size of system logs or messages to be analyzed is increased, an overhead for finding the cause is increased. When a failure is repetitively taken place in several units relating to a single failure cause, there was a difficulty in systematically tracking the failure.

SUMMARY OF THE INVENTION

In view of the above, the present invention provides a failure diagnosis method and apparatus using a resource relationship map, which are capable of reducing an overhead for analyzing the cause of failure by tracking the cause of failure, starting from a failed object, and then following entities of a relationship map, by using the resource relationship map including a resource object and a relation object, and systematically and precisely tracking the cause of failure by searching the resource relationship map.

In accordance with an aspect of the present invention, there is provided a failure diagnosis method including: generating a resource relationship map of resources to be managed on a network; when a failure occurs in a certain service object within the network, extracting a topology relationship map from the resource relationship map by using the failed service object as a root node; and searching a resource object caused the failure while checking related objects, starting from the root node in the topology relationship map.

In accordance with another aspect of the present invention, there is provided a failure diagnosis apparatus: a map management unit for generating a resource relationship map of resources to be managed on a network; and a failure processing unit for extracting a topology relationship map from the resource relationship map when a failure occurs in a certain service object within the network, and checking related resource objects in the topology relationship map to search a resource object caused the failure, starting from the failed service object as a root node in the topology relationship map.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENT

Embodiments of the present invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms should be defined throughout the description of the present invention.

Combinations of respective blocks of block diagrams attached herein and respective steps of a sequence diagram attached herein may be carried out by computer program instructions. Since the computer program instructions may be loaded in processors of a general purpose computer, a special purpose computer, or other programmable data processing apparatus, the instructions, carried out by the processor of the computer or other programmable data processing apparatus, create devices for performing functions described in the respective blocks of the block diagrams or in the respective steps of the sequence diagram. Since the computer program instructions, in order to implement functions in specific manner, may be stored in a memory useable or readable by a computer aiming for a computer or other programmable data processing apparatus, the instruction stored in the memory useable or readable by a computer may produce manufacturing items including an instruction device for performing functions described in the respective blocks of the block diagrams and in the respective steps of the sequence diagram. Since the computer program instructions may be loaded in a computer or other programmable data processing apparatus, instructions, a series of processing steps of which is executed in a computer or other programmable data processing apparatus to create processes executed by a computer so as to operate a computer or other programmable data processing apparatus, may provide steps for executing functions described in the respective blocks of the block diagrams and the respective steps of the sequence diagram.

Moreover, the respective blocks or the respective steps may indicate modules, segments, or some of codes including at least one executable instruction for executing a specific logical function(s). In several alternative embodiments, it is noticed that functions described in the blocks or the steps may run out of order. For example, two successive blocks and steps may be substantially executed simultaneously or often in reverse order according to corresponding functions.

Hereinafter, an embodiment of the present invention will be described in detail with reference to the accompanying drawings which form a part hereof.

Figure 1:
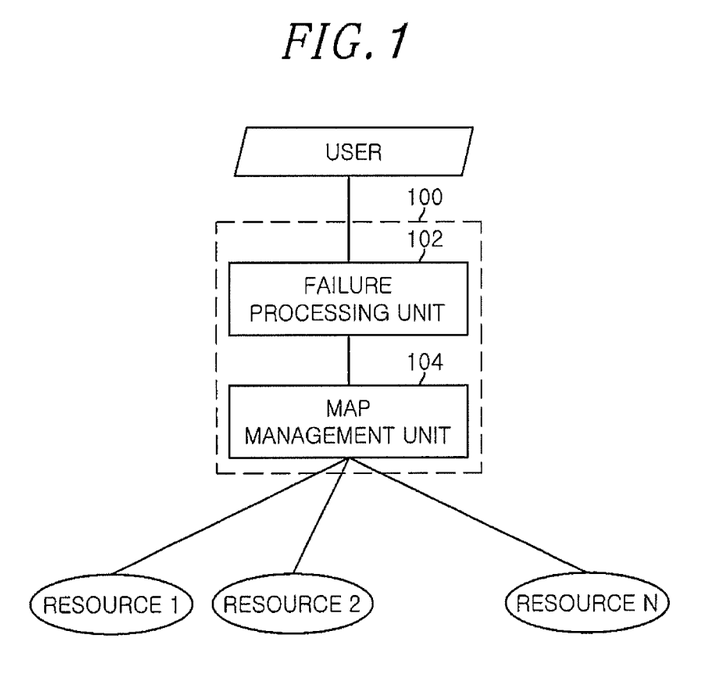
FIG. 1 is a block diagram showing a network of a failure diagnosis apparatus using a resource relationship map in accordance with an embodiment of the present invention.

FIG. 1 shows the configuration of a failure diagnosis apparatus 100 in a network environment using a resource relationship map in accordance with an embodiment of the present invention.

The operation of each unit of the failure diagnosis apparatus will be described in detail with reference to FIG. 1.

First, a map management unit 104 collects information regarding resources that are managed at home, in a building, or the like, and generates and maintains a resource relationship map based on the collected information.

Herein, the resources may refer to all resources such as a television (TV), a computer, various kinds of electronic devices, network equipment connected to the electronic devices, or the like which are installed at home, in a building or the like.

That is, when a failure occurs among all resources to be managed by the failure diagnosis apparatus 100 at home, in a building or the like, the map management unit 104 detects the occurrence of the failure and then informs a failure processing unit 102 of the failure occurrence.

When a failure occurs in a certain resource to be managed at home, in a building or the like, the failure processing unit 102 receives corresponding failure occurrence information through the map management unit 104. And then, the failure processing unit 102 detects the failed service resource object from the failure occurrence information and extracts a graph type relationship map including the service resource object as a root node and objects connected with it from the resource relationship map.

Thereafter, the failure processing unit 102 tracks the cause of failure while searching entities of the extracted relationship map. At this point, the search sequence may be based on any of various methods such as a breadth first search (BFS), a depth first search (DFS) and the like.

Figure 2:
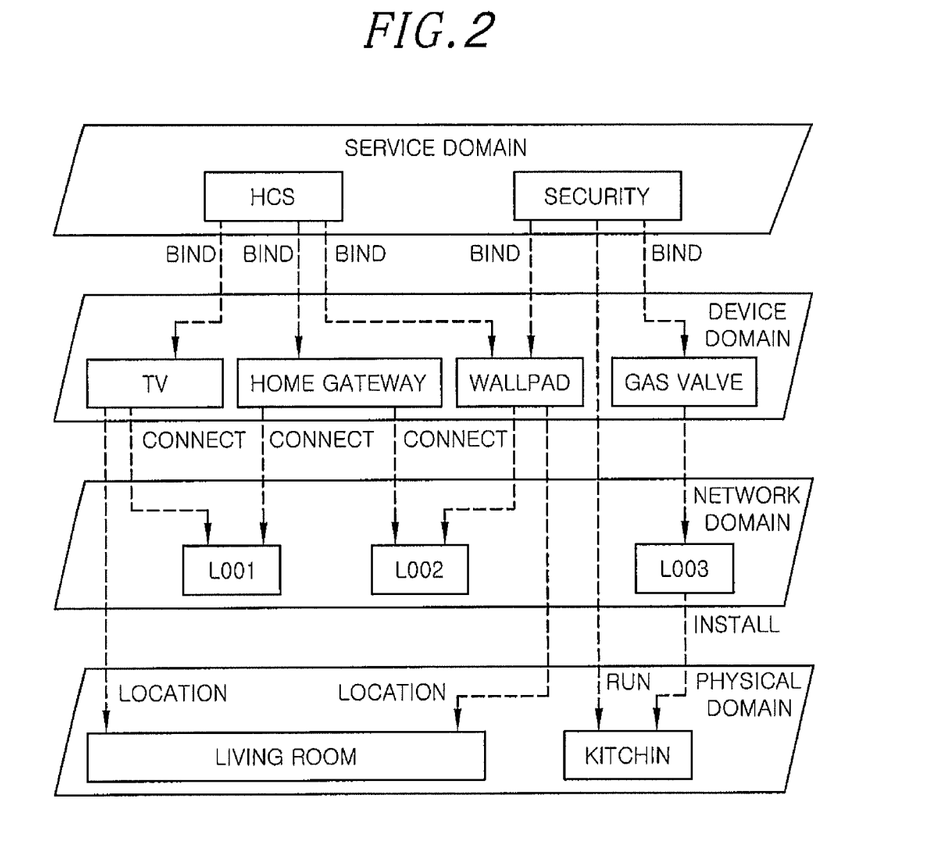
FIG. 2 illustrates an example defining the relationship between resources in a home or a building by a map management unit in accordance with the embodiment of the present invention.

FIG. 2 is a view showing a network relationship between resources managed by the map management unit 104 in accordance with the embodiment of the present invention.

Referring to FIG. 2, resources to be managed at home, a building or the like may include various electronic devices such as a TV and the like, network equipment connecting electronic devices through a network, a service space, a physical space and the like.

The map management unit 104 hierarchies the resources present at home or in a building or the like by domains, such as a service domain, a device domain, a network domain, a physical domain or the like based on the type of resources to establish the relationship between resources in the respective domains.

Figure 3:
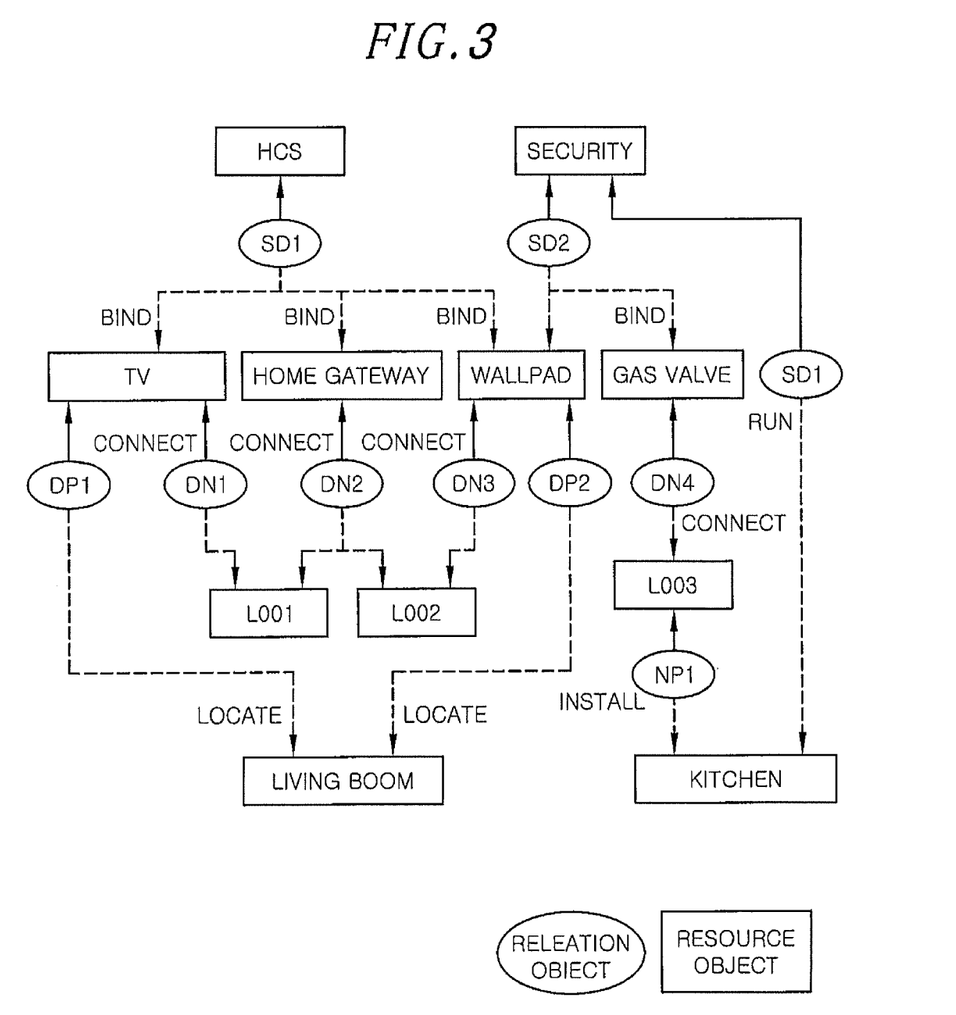
FIG. 3 shows an example of a resource relationship map generated by in the map management unit in accordance with the embodiment of the present invention.

FIG. 3 shows an example of a resource relationship map, generated by the map management unit 104, with respect to resources within home or a building, the relationship of which is established as shown in FIG. 2.

Referring to FIG. 3, the resource relationship map defines the relationship between respective resources pertaining to the hierarchical domains, and is a graph model having resource objects and relation objects as entities. In FIG. 3, the resource objects and the relation objects are presented with quadrangles and ovals, respectively.

The resource object may include various attribute information such as a name, a type, an identity (ID), state information, providing function, and the like of each of resources to be managed at home, in a building or the like.

The relation object is an object that specifies relationship among resource objects. It only deals with the inter-domain relationships. A relation object shall be represented as a relation ID, a relation name, a relation type, a source resource object, the list of target resource objects. The relation ID is a unique identifier of the relation in a resource management process and relation name is the name of the relation. The relation type represents the relationship between domains of resource objects such as "BIND", "CONNECT", "RUN" and "INSTALL" in FIG. 3. The source resource object indicates the subject of the relation. The target resource objects are one or more resource objects related with source resource object for a target domain.

The map management unit 104 generates a resource relationship map connecting each resource object and each relation object between domains over a network with reference to information regarding the resource object and the relation object. This generated resource relationship map is transferred to the failure processing unit 102 such that it is used to systematically search failed resources when a failure occurs on the network.

Figure 4:
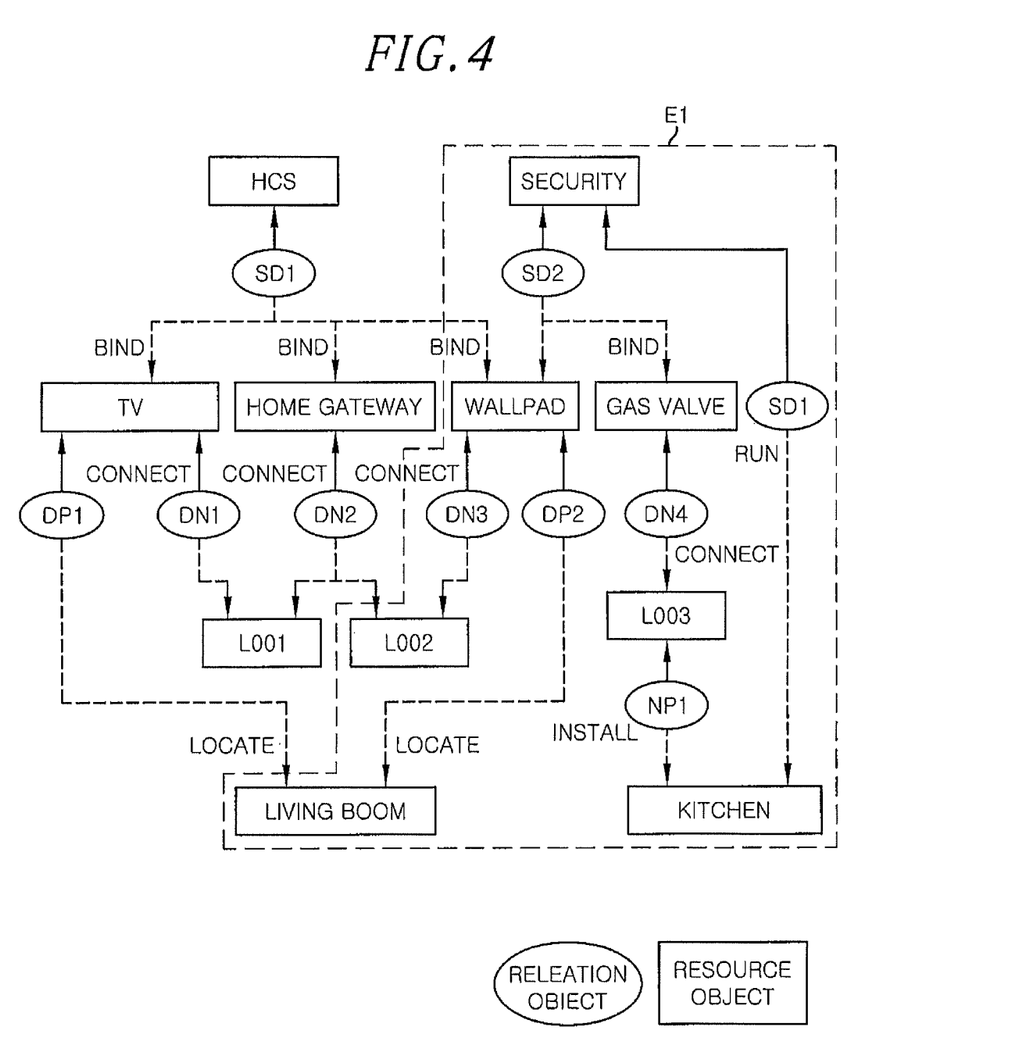
FIG. 4 presents an example of a topology type relationship map extracted from a failure processing unit in accordance with an embodiment of the present invention.

FIG. 4 illustrates a topology type relationship map extracted from the resource relationship map of FIG. 3 by the failure processing unit 102 in accordance with the embodiment of the present invention. Referring to FIG. 4, for example, when a failed object is "security", the failure processing unit 102 extracts only relation objects and resource objects connected to the failed "security" service object by using the resource relationship map transmitted from the map management unit 104 to define a topology relation map E1 related to the "security".

Figure 5:
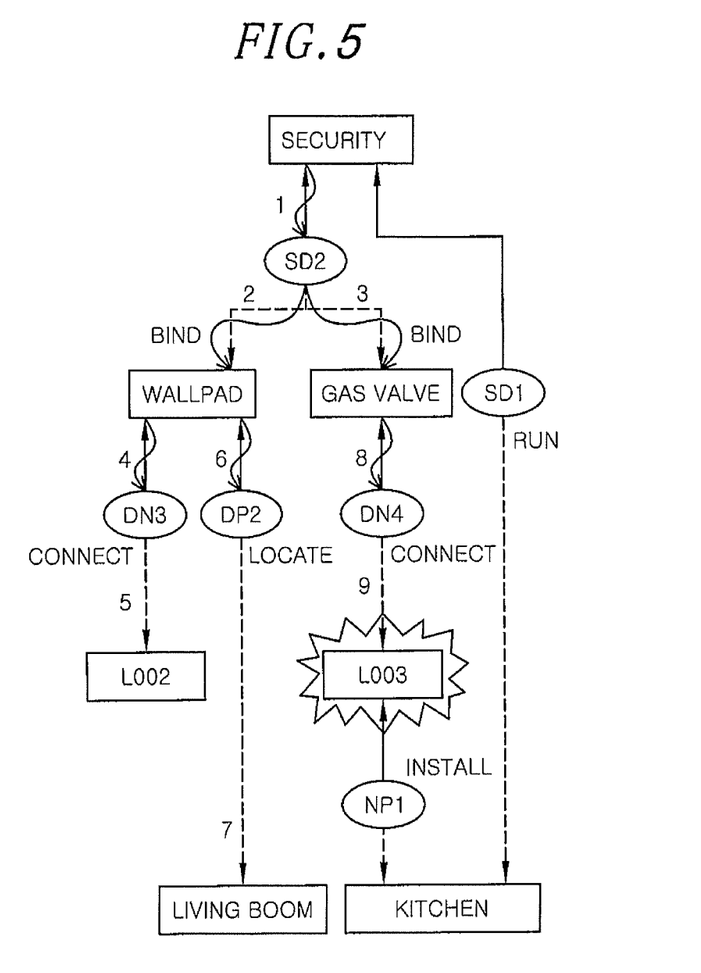
FIG. 5 illustrates an example of operation in which a failed object is diagnosed by the failure processing unit in accordance with the embodiment of the present invention.

FIG. 5 is a view illustrating the concept that the failure processing unit 102 tracks the cause of failure in accordance with the embodiment of the present invention.

Referring to FIG. 5, the failure processing unit 102 performs a sequential probing to find out the cause of the failure in related resource objects, for example, a wall pad, a gas valve, or the like, by starting said probing from the "security" service object which is verified that the failure occurred, and then following relation objects connected to the failed "security" service object, by using a topology relationship map newly extracted from the resource relationship map as shown in FIG. 4.

The failure processing unit 102 repeatedly performs the probing process described above for each resource object connected to the relation object while sequentially traversing the topology relationship map until an object causing the failure is found.

When a failed object is found through the probing process described above, the failure processing unit 102 may inform a user of a resource object contributing to the failure.

Figure 6:
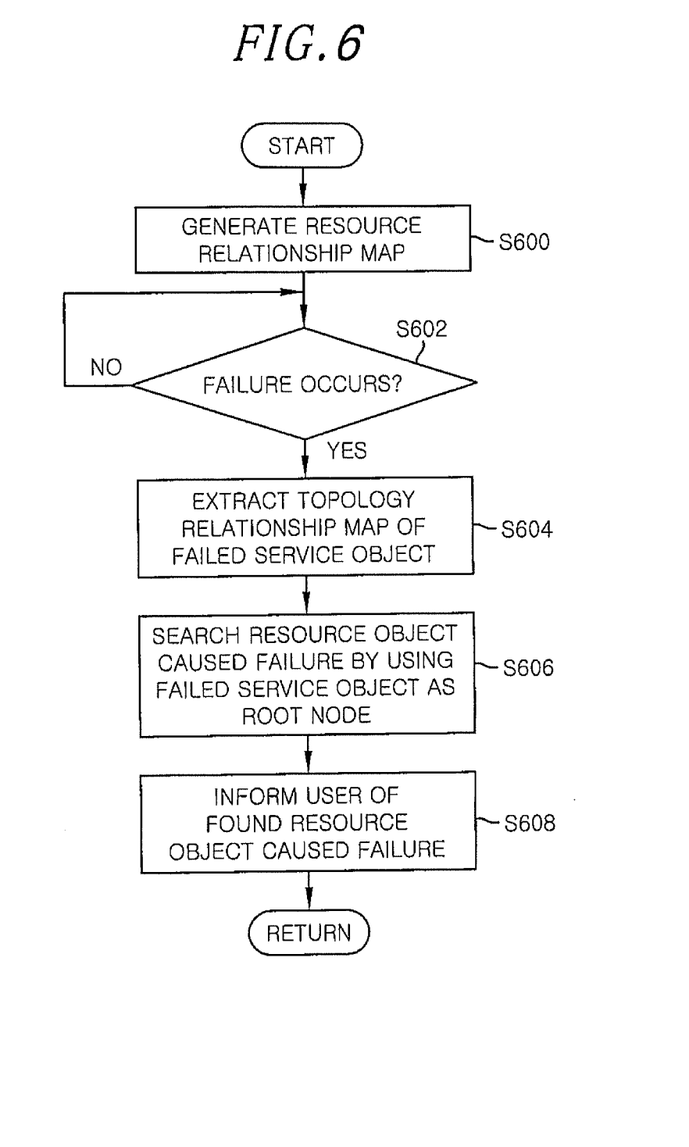
FIG. 6 depicts a control flowchart of the operation in which a failed object is diagnosed by the failure diagnosis apparatus in accordance with the embodiment of the present invention.

FIG. 6 shows a systematic failure diagnosis processing flow in a network environment using the resource relationship map in accordance with the embodiment of the present invention.

First, in step S600, the map management unit 104 hierarchies resources present at home or in a building or the like by domains, such as a service domain, a device domain, a network domain, a physical domain or the like based on the type of resources thereby generating a resource relationship map.

The resource relationship map generated above defines the relationship between respective resources pertaining to the hierarchical domains. Here, the resource object may include various attribute information such as a name, a type, an ID, state information, providing function, and the like of each of resources to be managed at home or in a building. Also, the relation object is an object that defines the relationship between different domains, and may include a relation name, a relation type, a relation ID, a source resource object, and a target resource object.

That is, the map management unit 104 generates a resource relationship map connecting each resource object and each relation object between the domains over a network with reference to the information regarding the resource object and the relation object as described above.

Next, the failure processing unit 102 performs a proving process as to whether a failure occurs in a certain resource object to be managed at home or in a building in step S602, and when it is recognized that the failure occurs, the failure processing unit 102 determines a failed service object and extracts the topology relationship map connected to the corresponding service object E1, as shown in FIG. 4, from the resource relationship map of FIG. 4 in step S604.

Thereafter, the failure processing unit 102 performs a sequential proving on related resource objects one by one, starting from the failed service object that is a root node of the extracted topology relationship map, and then following relation objects connected to the failed service object, until an object caused the failure is found, in step S606.

When the cause of failure is found through the probing process described above, the failure processing unit 102 may inform the user of a resource object contributing to the failure in step S608.

As described above, the failure diagnosis method and apparatus using a resource relationship map in accordance with the present invention can reduce an overhead for analyzing the cause of failure by tracking a failure cause, starting from a failed object, and then following entities of a relationship map, using the resource relationship map including a resource object and a relation object, and systematically and precisely track the cause of failure by searching the resource relationship map.

While the invention has been shown and described with respect to the particular embodiments, it will be understood by those skilled in the art that various changes and modification may be made without departing from the scope of the invention as defined in the following claims.

What is claimed is:

1. A failure diagnosis method comprising:
   generating a resource relationship map of resources to be managed on a network;
   when a failure occurs in a service object within the network, extracting a topology relationship map from the resource relationship map by using the failed service object as a root node; and
   searching a resource object that caused the failure while checking related objects, starting from the root node in the topology relationship map.

2. The method of claim 1, further comprising, after said searching the resource object that caused the failure:
   when the resource object that caused the failure is found, informing a user of the found resource object.

3. The method of claim 1, wherein the resource relationship map is generated as a graph model configured with resource objects and relation objects as entities.

4. The method of claim 3, wherein the resource object includes attribute information of the resources to be managed.

5. The method of claim 4, wherein the attribute information includes at least one of a name, a type, an identity (ID), and state information of each of the resources.

6. The method of claim 3, wherein the relation object defines a relationship between different domains in which the resources pertain.

7. The method of claim 6, wherein the relation object includes at least one of a relation name, a relation type, a relation ID, a source resource object, and a target resource object.

8. The method of claim 7, wherein said searching the resource object that caused the failure includes performing a sequential probing on the related resource objects connected to the root node one by one, starting from the root node in the topology relationship map, until the resource object caused the failure is found.

9. The method of claim 1, wherein the network is an in-house network built in a home or a building.

10. A failure diagnosis apparatus comprising:
    a map management unit for generating a resource relationship map of resources to be managed on a network; and
    a failure processing unit for extracting a topology relationship map from the resource relationship map when a failure occurs in a service object within the network, and checking related resource objects in the topology relationship map to search a resource object that caused the failure, starting from the failed service object as a root node in the topology relationship map.

11. The apparatus of claim 10, wherein when the resource object that caused the failure is found, the failure processing unit informs a user of the found resource object.

12. The apparatus of claim 10, wherein the map management unit generates the resource relationship map as a graph model configured with resource objects and relation objects, as entities.

13. The apparatus of claim 12, wherein the resource object includes attribute information of the resources to be managed.

14. The apparatus of claim 13, wherein the attribute information includes at least one of a name, a type, an identity (ID), and state information of each of the resources.

15. The apparatus of claim 12, wherein the relation object defines a relationship between different domains in which the resources pertain.

16. The apparatus of claim 15, wherein the relation object includes at least one of a relation name, a relation type, a relation ID, a source resource object, and a target resource object.

17. The apparatus of claim 10, wherein the failure processing unit performs a sequential probing on the related resource objects connected to the root node one by one, starting from the root node in the topology relationship map, until the failed object is found.

18. The apparatus of claim 10, wherein the network is an in-house network built in a home or a building.

* * * * *